G. F. SIMONDS.
Assignor to the SIMONDS MANUFACTURING COMPANY.
TEMPERING AND FORMING ARTICLES OF STEEL.
No. 7,465. Reissued Jan. 16, 1877.
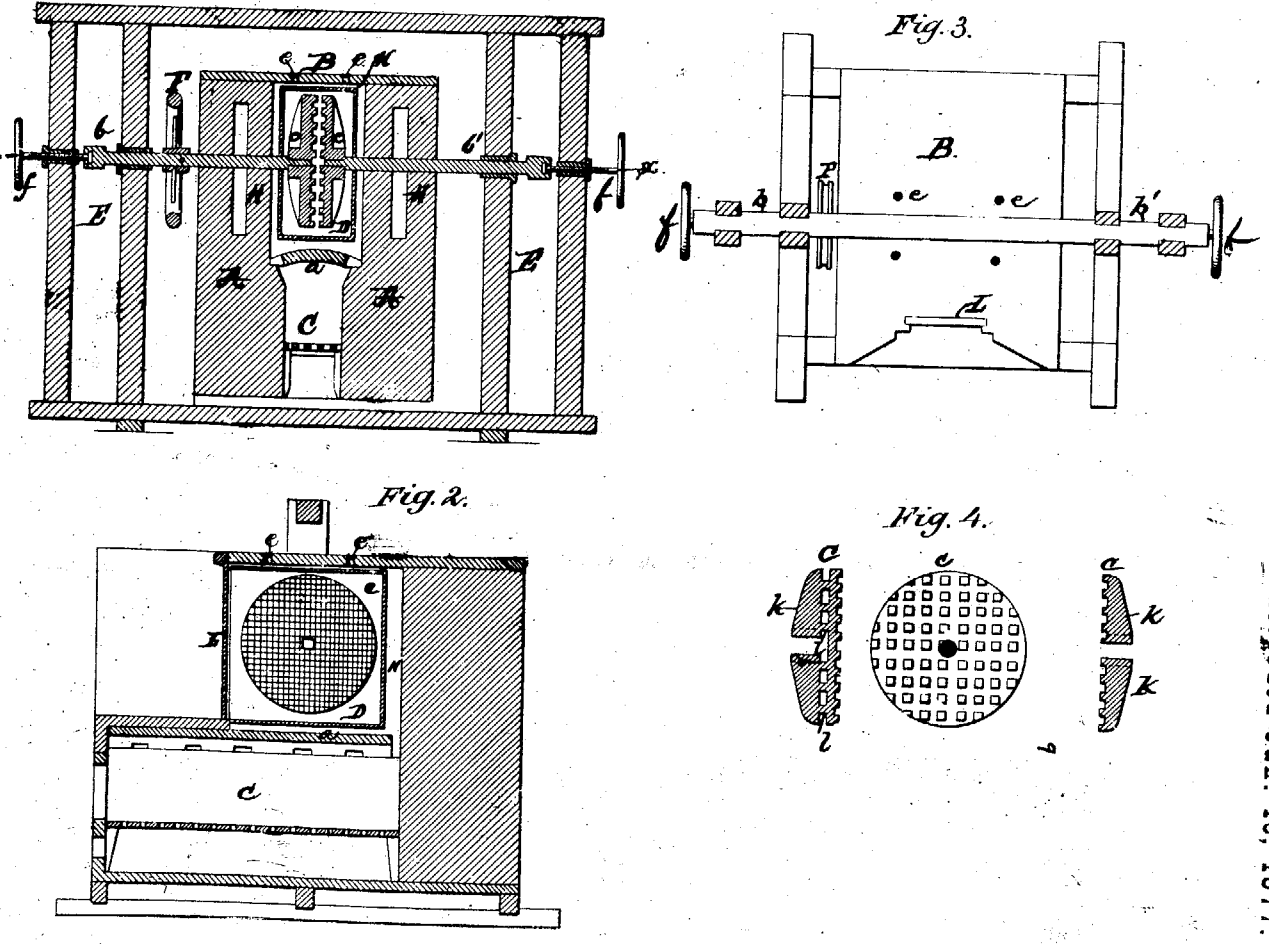
Witnesses:
C. Clarence Poole
Robt. K. Evans
Inventor:
Geo. F. Simonds
by his attys.
T. H. Evans & Co.

UNITED STATES PATENT OFFICE.

GEORGE F. SIMONDS, OF FITCHBURG, MASSACHUSETTS, ASSIGNOR TO THE SIMONDS MANUFACTURING COMPANY, OF SAME PLACE.

IMPROVEMENT IN TEMPERING AND FORMING ARTICLES OF STEEL.

Specification forming part of Letters Patent No. 164,736, dated November 9, 1875; reissue No. 7,465, dated January 16, 1877; application filed December 12, 1876.

DIVISION B.

*To all whom it may concern:*

Be it known that I, GEORGE F. SIMONDS, of Fitchburg, Massachusetts, have invented certain new and useful Improvements in Tempering and Forming Articles of Steel, of which the following is a clear, full, and exact description, reference being had to the accompanying drawings, making a part of this specification, in which—

Figure 1 is a central vertical cross-section. Fig. 2 is a central longitudinal section. Fig. 3 is a horizontal section and side elevation; Fig. 4, separate views of the formers.

My invention relates to the hardening, tempering, and bringing to their ultimate forms articles of steel, or of steel and iron combined, and is an improvement on Patent No. 151,167, dated May 19, 1874; and it consists in the process and in several combinations of devices hereinafter explained and claimed, and in the production of saws tempered and straightened, or brought to their ultimate form, without the usual process of hammering, and free from the irregular strain of hammered saws.

To enable others skilled in the art to make and use my invention, I will proceed to describe the exact manner in which I have carried it out.

In the said drawings, A A represent the wall of an oven; B, the roof; C, the fire-box, and D the tempering-oven and forming-chamber. This chamber I make air-tight and of any suitable material, preferably boiler-iron, with hot-air chambers H on each side and above it. The door L, which closes the tempering-chamber, I prefer to line with asbestus, or other non-conducting material, to prevent the escape of heat by radiation; but this is not essential to the successful working of my invention. The formers *c c* are suspended in the tempering-chamber, as shown in Fig. 1, by means of the revolving shafts *b b'*, provided with the necessary bearings in the frame-work E E. The outer ends of these shafts are provided with screws *f f*, by which they can be moved longitudinally, and the formers can be closed or opened within the tempering-chamber. By means of the wheel F the shaft *b* may be readily revolved, and when the formers are brought in contact or closed on an article to be tempered, it is evident that the shaft *b'* will also be caused to revolve with the shaft *b*, and the two formers may be revolved within the chamber D. This revolution of the formers may become desirable in order to secure more certainly a uniform temperature.

The great purpose of this construction is to place the article to be tempered and formed entirely out of the reach of any draft, and thus secure an evenness of heat essential to success. The heat in the surrounding chambers H may be readily regulated or directed from one portion of the chamber D to another by means of the small vents *e e* through the top of the furnace.

When the saw or article to be tempered and brought to its ultimate form has been properly hardened, it is placed between the formers *c c*, the door is closed, and the article is secured in position by the gradual movement of the screws *f f* until the pressure is sufficient to bring the piece to the desired form, where it is held subjected to the perfectly uniform and desired amount of heat until the article takes a permanent set to the required form, when it can be removed to make place for another.

My formers *c c* are of a novel construction, as shown in Fig. 4. The face of the former, instead of being a smooth flat surface, is grooved in such a manner as to divide it up into numerous small surfaces, resembling somewhat the face of a waffle-iron. Behind this face is a series of radial ribs, *k*, to strengthen and support the same.

I find it desirable to make the former double by interposing between the face-plate and the backing an open space, *l*, as shown in the drawings, Fig. 4, so as to admit the heat freely over the rear of the face-plate, which, being of uniform thickness, is thus more certainly heated to a uniform temperature.

The leading object of my invention is to produce a perfect saw without the necessity of hammering; and I find, after a long series of experiments, that, in order to straighten or bring to their ultimate form the saws, and leave them sufficiently hard, it is necessary to use a more highly-carbonized steel than it is practical to use by the present mode of straightening by hammering, by means of which, in connection with my oven and devices, I not only secure the desired object, but produce an article very much superior in many respects to those made by the old method.

It is evident from the above description that the formers may be arranged within the air-tight chamber otherwise than vertically, as shown in Fig. 1, without departing from the spirit of my invention, the essential feature of which is the means for securing a perfectly uniform temperature in the formers and tempering-chamber.

In the manufacture of saws it is not only necessary that they be straightened, or brought to any required form; but also that the strain or tension of the steel be properly adjusted, as a saw, brought to a perfect plane or other desired form, will not work satisfactorily if the strain or tension is irregular or improper. This difficulty has, to some extent, been overcome in the hammering process by pening or drawing those parts that are "fast," (which term among saw-makers signifies too small,) to conform to the parts that are "loose," or too large; but it being an impossibility to hammer or pene a saw uniformly, the strain necessarily is unequal, and a source of much trouble. The saws in use, being liable to tremble, are easily thrown out of position, and reducing them in size by filing or otherwise removes those parts held by the pening, causing them to warp.

Having thus described my invention, what I claim as new, and desire to secure by Letters Patent, is—

1. The improved process, herein described, of tempering and straightening saws by means of heat and pressure, and without hammering, the saw being protected from atmospheric currents, substantially as and for the purpose set forth.

2. As a new article of manufacture, saws tempered and left by the tempering-heat in ultimate form, and in a condition free from the irregular strain or buckle of hammered saws.

GEO. F. SIMONDS.

Witnesses:
GEO. H. EVANS,
RICHD. K. EVANS.